US008819998B2

(12) United States Patent
Boecker

(10) Patent No.: US 8,819,998 B2
(45) Date of Patent: Sep. 2, 2014

(54) SLIDING DOOR MODULE FOR A MOTOR VEHICLE DOOR

(75) Inventor: Frank Boecker, Hagen (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 616 days.

(21) Appl. No.: 12/682,082

(22) PCT Filed: Jul. 29, 2008

(86) PCT No.: PCT/EP2008/009917
§ 371 (c)(1),
(2), (4) Date: Dec. 6, 2010

(87) PCT Pub. No.: WO2009/053126
PCT Pub. Date: Apr. 30, 2009

(65) Prior Publication Data
US 2011/0072726 A1    Mar. 31, 2011

(30) Foreign Application Priority Data

Oct. 19, 2007    (DE) .......................... 10 2007 000 543

(51) Int. Cl.
*E06B 3/00*      (2006.01)
*E05B 65/12*     (2006.01)
*B60J 5/06*      (2006.01)
*E05B 17/00*     (2006.01)

(52) U.S. Cl.
CPC . *B60J 5/06* (2013.01); *E05B 79/04* (2013.01); *E05B 17/0012* (2013.01); *E05B 83/40* (2013.01); *E05B 83/36* (2013.01)
USPC ........................... 49/503; 49/348; 296/193.04

(58) Field of Classification Search
USPC ......... 49/502, 348, 349, 503, 360; 296/146.1, 296/146.2, 193.04, 72
See application file for complete search history.

(56) References Cited

U.S. PATENT DOCUMENTS 4,720,950 A * 1/1988 Bayer et al. ..................... 52/172
5,251,403 A * 10/1993 Compeau et al. ............... 49/502
(Continued)

FOREIGN PATENT DOCUMENTS

DE    1178721 B    9/1964
DE    2263421 A1    7/1974
(Continued)

OTHER PUBLICATIONS

Office Action for corresponding DE Application No. DE 102007000543.3-24, dated Mar. 12, 2008.
(Continued)

*Primary Examiner* — Katherine Mitchell
*Assistant Examiner* — Shiref Mekhaeil
(74) *Attorney, Agent, or Firm* — Timothy X. Gibson, Esq.; Gibson & Dernier LLP

(57) ABSTRACT

A door module for a sliding door of a vehicle is disclosed. The door module includes two closing modules. When in a first installation position, the first closing module does not protrude beyond a first outer edge of the door module. When in a first functional position, the first closing module protrudes beyond the first outer edge of the door module. While the second closing module is in a second installation position, it does not protrude beyond a second outer edge of the door module; however, when in a second functional position, the second closing module protrudes beyond the second outer edge of the door module and the first and second outer edges are spatially separated from each other. Finally, at least an actuating rod, comprised of plastic, transmits an actuating force from the first closing module to the second closing module.

21 Claims, 5 Drawing Sheets

(56) References Cited

U.S. PATENT DOCUMENTS

| | | | |
|---|---|---|---|
| 5,492,379 A * | 2/1996 | Staser et al. | 292/336.3 |
| 5,855,096 A * | 1/1999 | Staser et al. | 49/503 |
| 6,330,764 B1 * | 12/2001 | Klosterman | 49/375 |
| 7,877,932 B2 * | 2/2011 | Kriese et al. | 49/352 |
| 7,938,472 B2 * | 5/2011 | Stalhammar | 296/146.5 |
| 8,132,368 B2 * | 3/2012 | Mangold et al. | 49/375 |
| 2003/0097797 A1 * | 5/2003 | Cucchiara et al. | 49/502 |
| 2007/0113485 A1 * | 5/2007 | Hernandez et al. | 49/502 |
| 2012/0036780 A1 * | 2/2012 | Pleiss et al. | 49/70 |
| 2012/0153673 A1 * | 6/2012 | De Luca | 296/193.04 |
| 2012/0247023 A1 * | 10/2012 | Liu et al. | 49/386 |

FOREIGN PATENT DOCUMENTS

| | | |
|---|---|---|
| DE | 19644155 | 4/1998 |
| DE | 102004018444 A1 | 10/2005 |
| DE | 202005015870 U1 | 12/2005 |
| DE | 102004058870 A1 | 6/2006 |

OTHER PUBLICATIONS

International Search Report for corresponding PCT/EP2008/059917, dated Dec. 23, 2008.
International Preliminary Report on Patentability and Written Opinion for corresponding PCT/EP2008/059917, dated May 11, 2010.

* cited by examiner

SLIDING DOOR MODULE FOR A MOTOR VEHICLE DOOR

FIELD OF THE INVENTION

The invention relates to a sliding door module for a sliding door of a motor vehicle and a process for installing a sliding door module for a sliding door of a motor vehicle.

BACKGROUND OF THE INVENTION

Door modules are generally used today to simplify installation of technical elements such as window lifts, loudspeakers, electric switches, etc., on a motor vehicle door. This also applies to sliding door modules, which in this case are installed on a sliding door of a motor vehicle. For example, the technical elements mentioned above are affixed on a separate sliding door module in order to be attached subsequently, together with the module, in an opening present in the vehicle door. This greatly simplifies the installation of said technical components into a motor vehicle door.

It is also desirable, for example, to situate the closing module of the motor vehicle door on the door module such that installing the closing module on the motor vehicle door is simplified. However it proves to be problematic that the closing module, in its functional position, usually protrudes beyond the edge of the door module. This protrusion is necessary so that the closing or rotary latch found on the closing module closes flush with the front face of the motor vehicle door. However, this requires complicated mounting of the overhanging closing module into the opening of the vehicle door when the sliding door module is attached to said opening. This becomes even more complicated in sliding door modules in particular, because in a sliding door, overhanging closing modules are present on both front sides of the sliding door.

In order to solve this problem, for example, DE 20 2005 015 870 U1 suggests a sliding door module for a sliding door of a motor vehicle, in which at least one component assembly of the closing system can be stopped in a stand-by position on the bracket, and then after installation of the bracket, it can be transferred from its stand-by position into its functional position. Further alternative installation processes are known from DE 10 2004 018 444 A1 and DE 10 2004 058 870 A1.

DE 2 263 421 discloses a closing for a sliding door, in particular of a motor vehicle, whereby two closing elements are placed apart from one another on the sliding door, whereby the two closing elements are connected with one another via two actuating rods, whereby the two actuating rods are flexibly connected with one another around a lever that can be pivoted in a swivel axis.

DE 1 178 721 discloses an arrangement of door locking in motor vehicles, whose body comprises multiple parts separated by jointing, whereby at least two adjacent outer body parts are fixed, mounted and/or fastened by fastening bolts mounted on the frame.

DE 196 44 155 A1 discloses a motor vehicle door with outer door panel, inner door panel, interior paneling and component carrier for the door lock, as well as for other functional elements. The door lock features an approximately horizontal degree of freedom in adjustment, whereby the door lock, in its mounted state, protrudes with an overhang beyond the lock-side edge of the component carrier installed in the vehicle door.

BRIEF SUMMARY OF THE INVENTION

In contrast, the described subject matter is based on the task of creating an improved sliding door module for a sliding door of a motor vehicle, an improved sliding door, and an improved method for installing a sliding door module for a sliding door of a motor vehicle, with which the installation process can be simplified with regard to slidable closing modules and actuating elements.

In accordance with the described subject matter, a sliding door module for a sliding door of a motor vehicle is created with a first closing module, whereby the first closing module in a first installation position does not protrude beyond a first outer edge of the sliding door module, whereby the first closing module is designed for transfer into a first functional position, whereby the first closing module in the first functional position protrudes beyond the first edge of the sliding door module. Further, the sliding door module according to the described subject matter includes a second closing module, whereby the second closing module in a second installation position does not protrude beyond a second outer edge of the sliding door module, whereby the second closing module is designed for transfer into a second functional position, whereby the second closing module in the second functional position protrudes beyond the second outer edge of the sliding door module and whereby the first outer edge is spatially separated from the second outer edge. Further, the sliding door module includes at least two first actuating rods for transmitting actuating force from the first closing module to the second closing module, whereby the actuating rods are composed of plastic, whereby the first two actuating rods are flexibly connected with the first and second closing modules respectively, and a lever that can pivot in the y-direction around a swivel axis. Further, the sliding door module includes a third actuating rod for transmitting an actuating force from the first or second closing module to an actuating element, whereby the actuating element is a door-lock exterior control and/or a door-lock interior control and/or a door-lock interior safety, whereby the third actuating rod is comprised of plastic, whereby the third actuating rod is developed out of a first and a second rail and features a connecting element for connecting the first and second rails with one another and a locking element which locks the first and second rails in the functional position of the first and/or second closing module.

The closing module according to the described subject matter has the advantage that actuating elements can be arranged in a simple and cost-effective manner such that during transfer of the closing module from the installation position to the functional position, actuating elements, such as an actuating rod, automatically fit into the new geometric relationships. This means that the actuating rod fits into the spatial position of the closing module with regard to its geometric position as well as its length, through appropriate connecting elements. This is especially relevant because in one sliding door module, when installing the module into the opening provided for it in the vehicle door, two closing modules must be moved from the installation position into the functional position simultaneously. But this means that during transfer into the functional position, the first and second closing modules respectively must be moved to the front side of the vehicle door in opposite directions to one another. Such a simultaneous geometric transfer of both closing modules from installation position to functional position is possible due to an actuating rod, which thereby automatically adapts to the new geometric relationships. Because the actuating rod is comprised of plastic, mechanical components necessary for fitting the spatial dimensions such as angles and length, etc., can be cost-effectively manufactured, as some of these can be manufactured in one piece together with the actuating rod.

Further, an actuating rod made of plastic has the advantage that it can be manufactured as a plastic injection molding part, which allows the cross-section to vary, whereby the cross-sectional profile can be optimized depending on requirements. Functional components and actuating rods, such as a dislocation protection and reinforcing ribs, the actuating element itself and fastening elements such as fastening clips and similar, can be manufactured as integral components of the actuating rod using plastic injection molding. Manufacture of the actuating rod by means of plastic injection molding also allows more accurate manufacture of complicated shapes.

Further, actuating rods made of plastic cannot corrode, so corrosion protection, which is required for customary steel actuating rods, can be dispensed with. In this context, it must be noted that actuating rods, especially those for transmitting actuating force to actuating elements, which are located on the wet side of the door module, are subjected to great variations in temperature and humidity. Therefore, corrosion protection for customary actuating rods made of steel, as known from the state of the art, is indispensable.

Further, actuating rods made of plastic have the advantage that rattling noises, which are known from customary steel actuating rods, can be reduced or even prevented through the choice of a suitable material for appropriate actuating rods. Cushioning rubbers for noise reduction, grommets, noise reducing hoses and similar can be sprayed onto the actuating rod.

A further advantage of plastic actuating rods is the weight reduction.

Another additional advantage is that plastic actuating rods can be manufactured together with plastic door modules when the latter are manufactured. This can be realized during manufacture such that the plastic rods are manufactured in one piece with the plastic door module above thin bars. These actuating rods can thereby be removed from the door module through a simple bending or pulling movement in order to be inserted in appropriate receptacles of the closing module. Using this method to manufacture actuating rods, further production steps can be avoided. Mounting the plastic actuating rods thus manufactured into the closing module is necessary in any case, because the closing modules, due to the choice of material, can be manufactured independently of the plastic actuating rods and thus not in one piece with them.

According to one embodiment of the described subject matter, the sliding door module further includes a door locking device, whereby the door locking device is connected essentially vertically with the second closing module by means of a second actuating rod for transmitting an actuating force, whereby the second actuating rod is also made of plastic.

The fact that the door locking device is connected with the second closing module via the second plastic actuating rod yields the same advantages that are addressed above, with regard to weight reduction, avoidance of rattling noises, corrosion prevention, etc.

According to one embodiment of the described subject matter, the door locking device is located on the bottom edge of the sliding door. According to a further embodiment of the described subject matter, the sliding door module further includes a first latching element, whereby the first latching element is designed to fix the first closing module in the first installation position and/or in the first functional position. Further, the sliding door module includes a second latching element, whereby the second latching element is designed to fix the second closing module in the second installation position and/or in the second functional position. Such a latching element has the advantage that in the installation position, the closing modules are fixed, but they can be moved into their functional positions with minimal effort and held there autonomously by the latching elements, to the extent that an appropriate fastener can simply fix it onto the sliding door.

According to one embodiment of the described subject matter, the latching element is rod-shaped. The latching element thereby preferably features a number of latching positions. This has the advantage that door modules can be used universally for different types of vehicle doors with different door dimensions. In this case the installation position of the closing module on the sliding door module is preferably always the same; however, the front sides of the vehicle door, with which the lock catches of the closing modules must close flush in the functional position, can be at different distances from the installation position of the lock catches of the closing modules. In this case, due to the presence of a number of latching positions, it is possible to achieve a provisional fastening of the closing modules via the latching elements on the door module at any distance of the lock catch from the original installation position. The final installation can then take place.

According to a further embodiment of the described subject matter, the first and/or the second latching element is formed in one piece with the sliding door module. This has the advantage that the latching elements, for example, can be manufactured cost-effectively in one injection molding process together with the door module. In another embodiment of the described subject matter, appropriate counterparts to the latching elements, such as latching noses of the closing modules, are preferably here also formed in one piece with the closing modules.

According to the described subject matter, the third actuating rod is formed through a first and second rail and further features a connecting element for joining the two rails to one another. The connecting element can be a hinge or a film hinge. Thus it is possible that one rail is connected with one of the closing modules while the other rail is connected with one of the actuating elements. When the closing module is moved, due to the presence of the hinge, the two rails can align themselves and extend such that in the installation position of the closing module a sufficiently stable connection exists in the form of an actuating rod between the actuating element and the closing module. In order to further increase the stability, the actuating rod preferably features the connecting element and a locking mechanism to lock the first and second rails in the functional position of the closing module. This has the advantage that the actuating rod is so rigidly mounted that it withstands both pressure and tension without yielding.

As an alternative to the use of a hinge or film hinge, it is also possible to furnish the first and second rails each with plastic gearing such that the two rails can be continuously offset against one another by virtue of the interlocking plastic gearing. This has the advantage, in conjunction with the slidable closing modules, that in any relative position of the closing module with respect to the door module, there is a sufficiently inflexible formation of the plastic actuating rod. This stiff plastic actuating rod is thereby resistant to pressure and tension.

According to one embodiment of the described subject matter, the actuating rods feature one or more reinforcing ribs, whereby the reinforcing ribs are arranged on a radius of the actuating rods. For example, one or more reinforcing ribs are located on a bend of the actuating rod in order to achieve the required stability in the area of the bend for the transmission of torque.

According to a further embodiment of the described subject matter, the actuating rod features a variable cross-section in its longitudinal course. The cross-section can for example form a T-profile in sections, or it can be rectangular or triangular, or feature some other geometric shape.

According to a further embodiment of the described subject matter, the actuating rod is comprised of different plastics in different sections. This can for example serve to reduce friction in certain sections in which there is increased friction of the actuating rod against surrounding elements of the door module or the vehicle door.

According to one embodiment of the described subject matter, the first closing module can be transferred into the first functional position through a first translational movement and/or into the first functional position through a first rotary motion around a first swivel axis. According to a further embodiment of the described subject matter, alternatively or in addition, the second closing module can be transferred into the second functional position through a second translational movement and/or into the second functional position through a second rotary motion around a second swivel axis. Thereby the first and/or second swivel axis runs mainly in the y-direction of the vehicle. With regard to the translational movement, the rod-shaped latching element is preferably designed to conduct the translational movement. In both cases it is ensured that the first or second closing module can be transferred from the installation position into the functional position through a simple movement, whereby the respective closing module in the installation position does not protrude beyond the outer edge of the door module.

According to a further embodiment of the described subject matter, the first closing module and the second closing module can be transferred together into their respective functional positions via the first or second translational movement. This has the advantage that in only a single work step after attaching the sliding door module onto the opening of the vehicle door provided for this purpose, both closing modules can be transferred from the installation position into the functional position.

According to a further embodiment of the described subject matter, the first closing module features a first draw hook mounting for a draw hook, whereby the first draw hook mounting is designed for transferring the first closing module from the first installation position into the first functional position by way of the draw hook. Alternatively or in addition to this, the second closing module features a second draw hook mounting for a draw hook, whereby the second draw hook mounting is designed for transferring the second closing module from the second installation position into the second functional position by way of the draw hook. The first and second draw hook mountings are preferably the rotary latches of the first and second closing modules, respectively.

Thus simply by hitching the draw hook into the rotary latch of the respective closing module, the closing modules can be pulled from the installation position into the functional position on the front sides of the vehicle doors, in order to be fixed there ultimately through appropriate fastening means on the vehicle door. As already noted above, in a preferred embodiment it is helpful if the first closing module and the second closing module can be transferred together into the respective functional positions by a single pulling motion by one of the draw hooks.

In a further aspect, the described subject matter relates to a sliding door of a motor vehicle with a sliding door module according to the described subject matter.

In a further aspect, the described subject matter relates to a method for installing a sliding door module for a sliding door of a motor vehicle with a first closing module, whereby the first closing module in a first installation position does not protrude beyond a first outer edge of the sliding door module, whereby the first closing module is designed to be transferred into a first functional position, whereby the first closing module in the first functional position protrudes beyond the first edge of the sliding door module.

Further, the sliding door module includes a second closing module, whereby the second closing module in a second installation position does not protrude beyond a second outer edge of the sliding door module, whereby the second closing module is designed to be transferred into a second functional position, whereby the first closing module in the second functional position protrudes beyond the first edge of the sliding door module, whereby the first outer edge is spatially separated from the second outer edge. Further, the sliding door module includes at least a first actuating rod for transmission of an actuating force from the first closing module to the second closing module, whereby the first actuating rod is comprised of plastic. The method for installing this sliding door module thereby includes the first step for positioning the sliding door module in a mounting device of the sliding door, whereby the first and second closing modules are located in their respective installation positions. In a further step, the transfer of the first closing module from the first installation position into the first functional position takes place, and finally the transfer of the second closing module from the second installation position into the second functional position takes place.

The method of installation according to the described subject matter thereby has the advantage that a simple installation of the closing module onto the motor vehicle door using the sliding door module on which the closing module is pre-mounted, is possible without having to undertake laborious mounting movements of the closing module into the mounting devices or openings of the vehicle door. Furthermore, with appropriate configuration of the plastic actuating rod, further work steps, which are necessary according to the state of the art, can be omitted. For example, in the state of the art, moving the closing module from the installation position to the functional position requires that subsequent mounting or hanging of the actuating rod into an appropriate receptacle, and if need be, also appropriate actuating elements, takes place. This additional work step can now be avoided through the use of, for example, retractable or bendable actuating rods, because these automatically adapt to the new geometric conditions during transfer of the closing module from the installation position into the functional position. This is particularly relevant given that the attachment of actuating rods onto closing modules is of course significantly more manageable prior to inserting the sliding door module into the mounting device or opening of the vehicle door, because all the components are much more accessible at this point than when the sliding door module is already situated in the opening of the motor vehicle door.

According to one embodiment of the described subject matter, the first closing module features a first draw hook mounting for a draw hook and/or the second closing module features a second draw hook mounting such a draw hook, whereby the transfer of the first and second closing modules from the respective installation positions into the respective functional positions further comprises the steps of inserting the draw hook into the first draw hook mounting and the step of transferring the first closing module from the first installation position into the first functional position through a pulling motion with the draw hook. The method further includes the step of inserting the draw hook into the second draw hook mounting, and the transfer of the second closing module from the second installation position into the second functional position through a pulling motion with the draw hook. However, it must be noted that re-inserting the draw hook into the second means and transferring the second closing module from the second installation position into the second functional position through pulling the draw hook is omitted if the first and second closing modules are linked to one another such that transferring the first closing module into its functional position automatically also transfers the second closing module simultaneously.

The draw hook can generally be reused because for example it can be rotated out of the rotary latch of the closing module with a simple rotary movement and can be removed after the closing module or modules have been transferred from the installation position into the functional position through the pulling motion.

BRIEF DESCRIPTION OF THE DRAWINGS

The novel features believed characteristic of the disclosed subject matter will be set forth in any claims filed later. The disclosed subject matter itself, however, as well as a preferred mode of use, further objectives, and advantages thereof, will best be understood by reference to the following detailed description of illustrative embodiments when read in conjunction with the accompanying drawings, wherein:

In the following, elements similar to one another are identified with the same reference numerals.

DETAILED DESCRIPTION OF ILLUSTRATIVE EMBODIMENTS

Although described with particular reference to specific embodiments, those with skill in the arts will recognize that the disclosed embodiments have relevance to a wide variety of areas in addition to those specific examples described below.

All references, including publications, patent applications, and patents, cited herein are hereby incorporated by reference to the same extent as if each reference were individually and specifically indicated to be incorporated by reference and were set forth in its entirety herein.

Figure 1A:
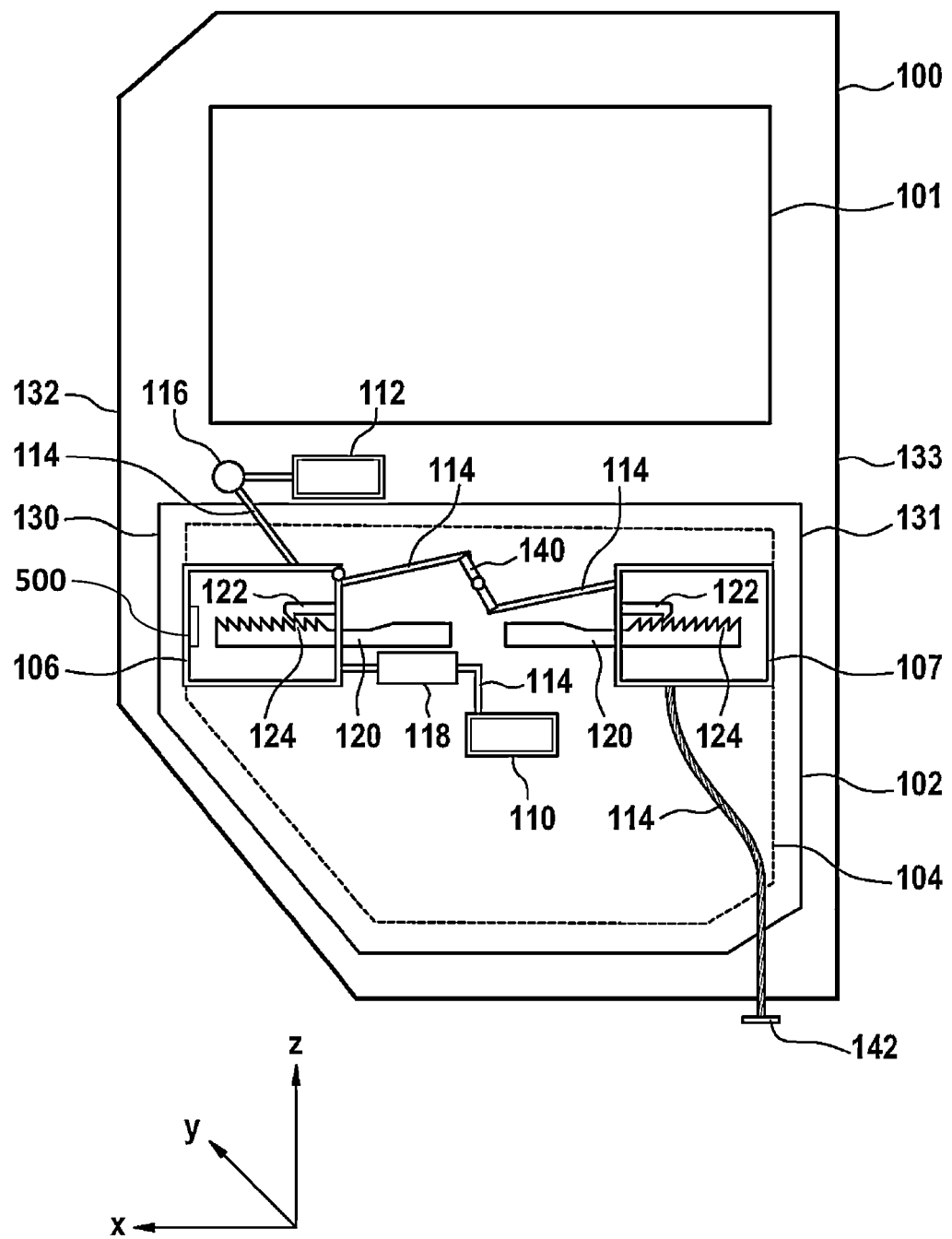
FIG. 1a: a schematic view of a sliding door module according to the described subject matter and a sliding door of a motor vehicle with the closing modules in the installation positions.
Figure 1B:
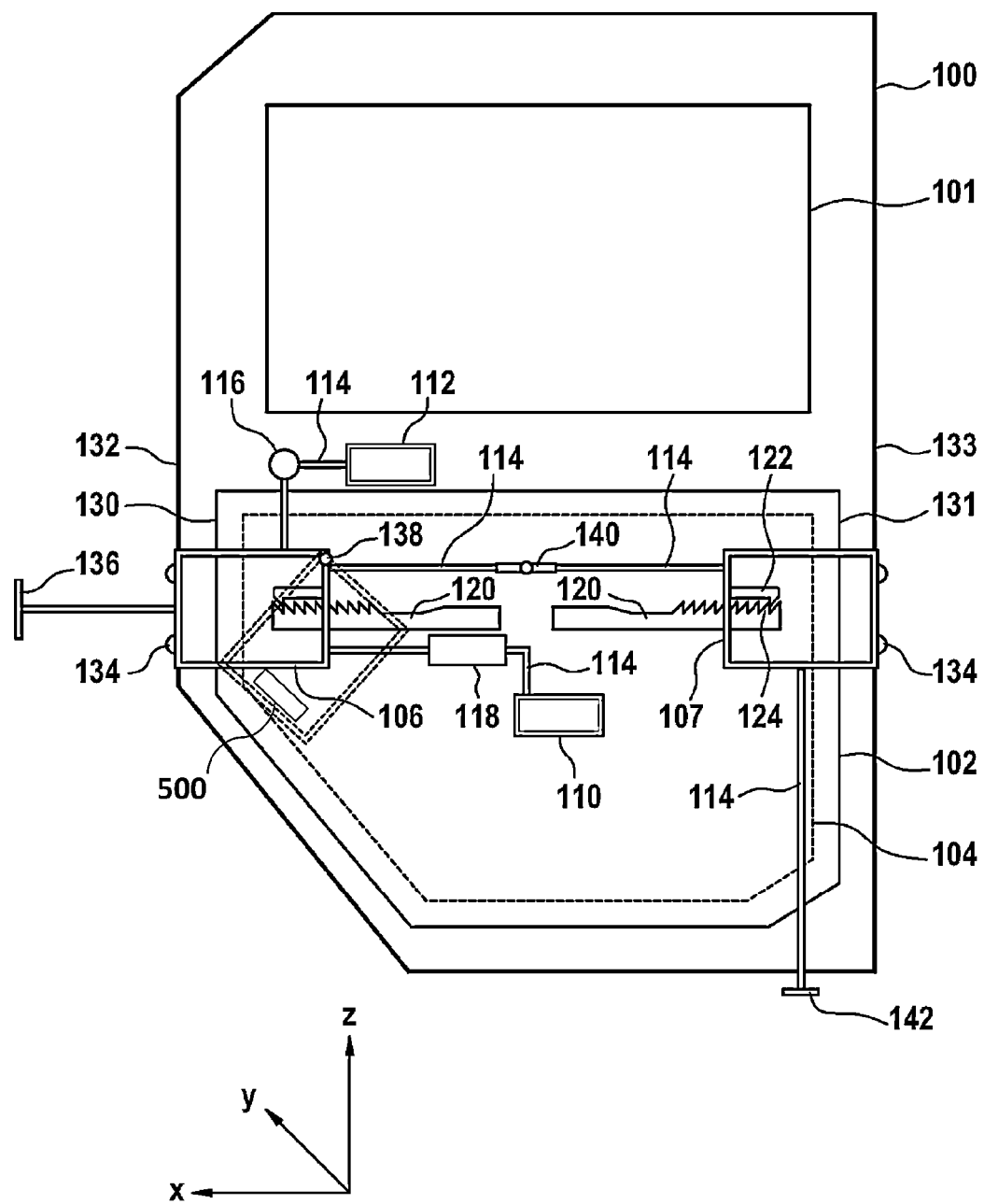
FIG. 1b: a schematic view of a sliding door module according to the described subject matter and a sliding door of a motor vehicle with the closing modules in the installation positions.

FIGS. 1a and 1b show schematic views of a sliding door module 102 and a motor vehicle sliding door 100 according to the described subject matter. The motor vehicle sliding door 100 thereby features both a window pane opening 101 and a mounting device in the form of an opening 104, onto which the sliding door module 102 is inserted for installation of the sliding door module 102 onto the motor vehicle door 100. In this condition the two closing modules 106 and 107, which are pre-installed on the sliding door module 102, are in an installation position such that while in the installation position they do not protrude beyond the edge 130 or 131 of the door module 102.

Further the door module 102 includes—in addition to elements not illustrated here, such as a window lift, loudspeakers, electrical elements, etc.—a door-lock interior control 110 and a door-lock exterior control 112. Both the door-lock interior control 110 and the door-lock exterior control 112 are connected with closing modules 106 and 107, respectively, by means of actuating rods 114.

The actuating rods 114 thereby feature various elements that enable them to adapt to the new geometric conditions when the closing modules 106 and 107 are moved in the x-direction of the motor vehicle door 100. For example, the actuating rod 114, which connects the door-lock interior control 110 and the closing module 106 with one another, features a connecting element 118. This connecting element 118 is thereby designed such that a variable change in length of the actuating rod 114 is possible in the x-direction. Such a connecting element 118 can for example be formed by two interconnecting plastic gearings, which allow the elongation of actuating rod 114 in the x-direction when there is spatial separation of the closing module 106 from the door-lock interior control 110.

Alternatively or additionally, a hinge is provided for actuating rod 114 between the door-lock exterior control 112 and the closing module 106. The hinge 116 and its associated actuating rod 114 are thereby constructed such that after a translational movement of the closing module 106 in the x-direction, a stiff connection between the door-lock exterior control 112 and the closing module 106 is still ensured. In this case the lower part of actuating rod 114, which is arranged flexibly on the closing module 106, follows the translational movement of the closing module 106.

Referring now to FIG. 1a which shows the spatial position of closing modules 106 and 107 in their installation positions. In their installation positions, these closing modules are positioned with regard to the door module 102 such that closing modules 106 and 107 do not protrude beyond the edges of the door module 102. In contrast, FIG. 1b shows the corresponding positions of closing modules 106 and 107 in their functional positions, in which closing modules 106 and 107 close flush with the front sides 132 and 133 of the motor vehicle door 100.

In order to enable a clean transfer for example of the closing module 106 from its installation position shown in FIG. 1a into its functional position shown in FIG. 1b, the latching element 120 is provided. The same applies also for the transfer of closing module 107 from the installation position into the functional position. The latching element(s) 120 are rod-shaped and feature a number of gear teeth 124. The latching element 120 is preferably constructed in one piece with the door module 102. As a counterpart to the latching element 120, there is a latching nose 122 on the closing module 106 or 107. This latching nose 122 thereby engages into the respective counterpart gear teeth 124 of the latching element 120. This means that in the installation position shown in FIG. 1a, closing modules 106 and 107 are fixed and to a large extent mechanically stable in said installation position.

Now the closing module 106 can be pulled into its functional position shown in FIG. 1b through a translational movement in the x-direction, for example, through insertion of a draw hook 136 into the rotary latch 500 of the closing module 106. The latching nose 122 thereby catches in the different gear teeth 124 of the latching element 120, one after another. In each of these latching positions the closing module 106 is fixed sufficiently stably in its respective geometric position with regard to the door module 102. Thus in the case that the front side 132 of another motor vehicle door lies nearer the edge 130 of the sliding door module 102, the closing module 106 can be fixed in relation to the other front side 132 of the other motor vehicle door 100 on the sliding door module 102, such that for example the latching nose 122 does not catch as shown in FIG. 1b in the last counterpart gear tooth 124 but rather for example only in the penultimate gear tooth.

A further option for transferring the closing module 106 from its installation position into the functional position is through pivoting the closing module 106 around a swivel axis 138, which generally runs in the y-direction of the motor vehicle 100. The installation position is indicated in FIG. 1b with dashed lines. Through appropriate insertion of the draw hook into a counterpart mounting device of closing module 106, the closing module 106 can now be transferred from its tilted installation position into the horizontal functional position by means of a pulling motion, for example in the x-z-direction.

The steps described above, with insertion of the draw hook 136 into the rotary latch 500 of a closing module, etc., could also be carried out analogously for the closing module 107. However, it is preferable if a coupling that is required to operate the closing assembly anyway is used between closing module 106 and closing module 107, so that when closing module 106 is transferred from the installation position into the functional position, closing module 107 is also transferred simultaneously from its installation position into the functional position. This is realized in the previous example in FIGS. 1a and 1b such that closing module 106 and closing module 107 are joined together with an actuating rod 114. Further, closing modules 106 and 107 are joined together through a lever 140, which can pivot around a swivel axis in the y-direction. Through pulling the closing module 106 from the installation position into the functional position, the upper end of the lever 140 is pulled so that lever 140 pivots around the swivel axis in the y-direction and thereby with its lower end presses the actuating rod 114 in the direction of the closing module 107. Through this pressure of the actuating rod 114 in the direction of closing module 107, closing module 107 is also transferred from its installation position into its functional position. The lever is thereby preferably constructed such that here also, plastic latching elements are used in conjunction with the swivel axis used, so that in the position shown in FIG. 1b, a final, almost linear, stiff connection exists between the actuating rods 114, which run to the closing module 106 or 107, and the lever 140. This ensures that when closing modules 106 or 107 are actuated, pressure or tension operating on the actuating rods 114 and the lever 140 will not lead to the lever 140 folding back again.

It must be noted that in another embodiment, instead of using a draw hook 136 it is possible to shift the closing modules 106 and 107 by turning the lever 140 around the y-axis: in this case, for example, a hexagon socket wrench is inserted into the y-axis of the lever 140 and by turning the hexagon socket wrench counterclockwise, the lever 140 is turned such that closing modules 106 and 107 are pushed away from one another by means of the rods 114 found respectively on the ends of the lever 140.

Either after the purely translational movement in the x-direction, as described above, or after the movement in the x-z-direction for transferring the closing modules 106 and 107 into their functional positions, now closing modules 106 and 107 can be fixed onto their front sides 132 and 133 respectively, of the motor vehicle door 100, with appropriate fasteners 134. Then, if using a draw hook, the draw hook 136 can be removed from closing module 106 and, if necessary, also from closing module 107 (if this is not transferred into its functional position together with closing module 106), so that the draw hook 136 can be used for another installation step in another motor vehicle door. The same naturally applies to removing the hexagon socket wrench.

In addition FIGS. 1a and 1b show a door locking device 142, which also is connected with closing module 107 via an actuating rod 114. Here it also proves to be extremely advantageous when the actuating rod 114 is constructed of plastic so that corresponding connecting elements can be used so that during the translational or rotary movement of closing module 107 from its installation position to its functional position, the actuating rod 114 will not bend. Alternately, the actuating rod 114, through the appropriate choice of plastic, can be constructed so it can bend flexibly, so that due to the locking device 142 fixed relative to the sliding door 100, the actuating rod 114 in the installation position is slightly bent, whereby after transfer into the functional position, this bend is removed and the actuating rod runs almost vertically from the closing module 107 to the locking device 142. This bent shape of the actuating rod 114 is indicated in FIG. 1a. It must be noted, however, that due to the risk of material fatigue, such a bent form is preferably avoided, and here also, appropriate hinge elements or similar should be used.

Figure 2:
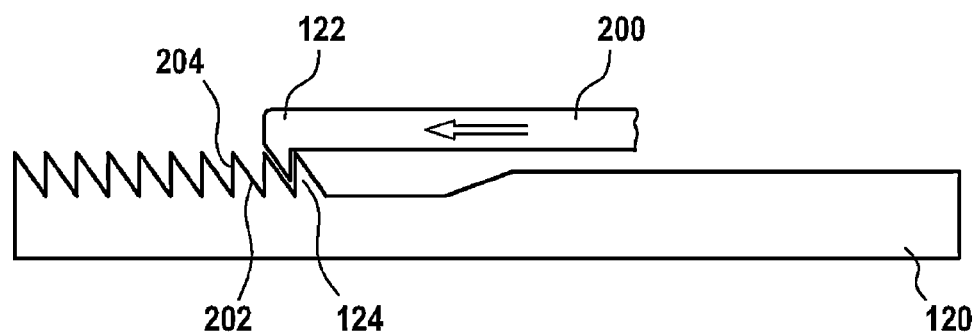
FIG. 2: a schematic view of a latching rod.

For further purposes of illustration, FIG. 2 shows an enlarged schematic view of a latching rod, as it is used to temporarily fix the closing module 106 in relation to the door module 102. The latching rod (rod-shaped latching element) features a number of gear teeth 124, into which a latching nose 122, which is fixed on the closing module 106, can engage. By moving the closing module fixed on the latching nose 122 in the direction 200 (x-direction of the motor vehicle), the latching nose 122 engages consecutively in the different gear teeth of the latching rod (or the latching element) 120. In each of the corresponding latching positions a sufficiently stable positioning of the closing module 106 fixed on the latching nose 122 is ensured in relation to the door module 102 or also in relation to the latching element 120.

The geometric arrangement of gear teeth 124 shown in FIG. 2 ensures that after the latching nose 122 moves into a new element of the gear teeth 124, the latching nose 122 cannot snap back into a previous element of the gear teeth 124. For this reason the geometric structure of the gear teeth 124 is designed such that it rises slightly in the direction 200 so that the opposite latching nose can glide lightly along the rising gearing when moved in direction 200. After this rise 202, for each gear tooth 124 there follows an abrupt and almost vertical drop 204 so that a reverse movement of the latching nose 122 opposite to the direction 200 is effectively prevented.

Figure 3:
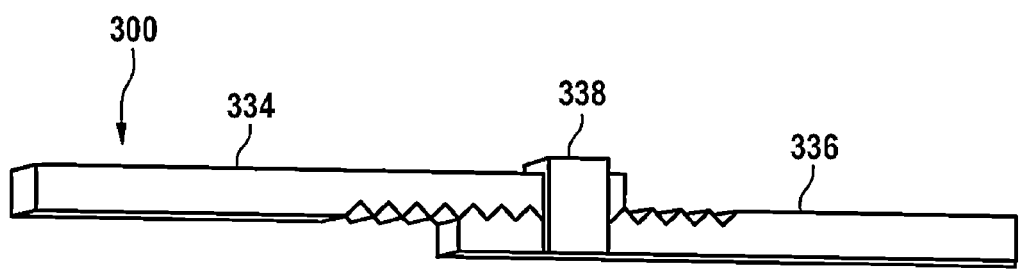
FIG. 3: a schematic view of an actuating rod with latching elements.

FIG. 3 shows a schematic view of an actuating rod 300 with latching elements. Actuating rod 300 is for example an actuating rod 114 with integrated connecting element 118, as shown in FIGS. 1a and 1b. Actuating rod 300 features a first rail 334 and a second rail 336. Both rails 334 and 336 have tooth-shaped elements that interlock. A retaining element 338 presses rails 334 and 336 against one another so that due to the interlocking gear teeth on both sides, there is a sufficiently high mechanical stability preventing rails 334 and 336 from pulling apart. However, retaining element 338 is constructed such that with a sufficient specified amount of effort, it is possible to move the first and second rails 334 and 336 so that the one tooth of the interlocking gear teeth is skipped. This is necessary, for example, when as shown in FIGS. 1a and 1b, to move the closing module 106 from its installation position to its functional position, the corresponding actuating rod 114 is supposed to be lengthened by means of the connecting element 118.

In a further embodiment in FIG. 3, it is also possible, in the installation of actuating rod 300, to omit the retaining element 338 at first. Thus in the desired relative position of the first and second rails 334 and 336, both rails are positioned above one another with their gear teeth. In the desired position, the retaining element 338 is thereupon arranged around the first and second rails, e.g. in the shape of a film hinge, and closed, in order to press the two rails 334 and 336 against one another and thus fix them to one another through the gear teeth. The film hinge 338 can thereby be constructed as an integrated component of rails 334 and/or 336. For example, film hinge 338 can be manufactured together with parts 334 and 336 in a single production step, by means of plastic injection molding.

Figure 4:
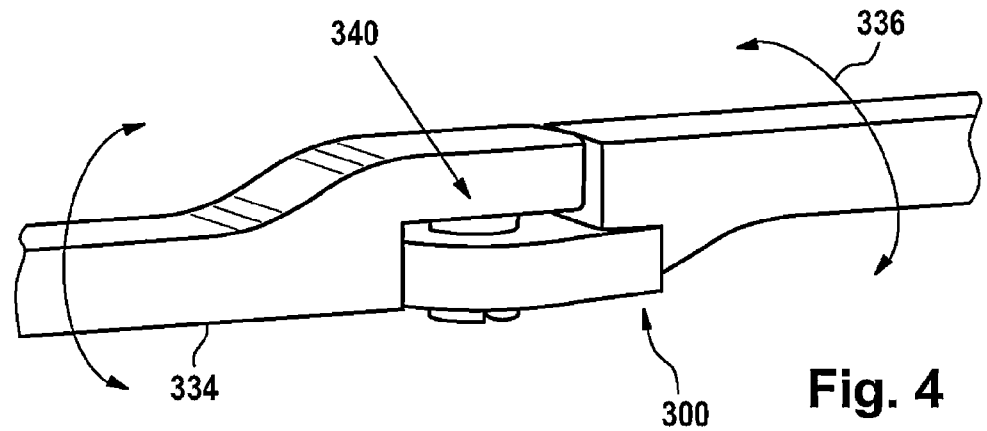
FIG. 4: a schematic view of an actuating rod with a swivel connection.
Figure 5A:
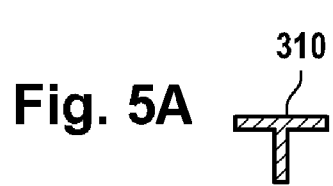
FIGS. 5A-5E: schematic views of an embodiment of an actuating rod.
Figure 5B:
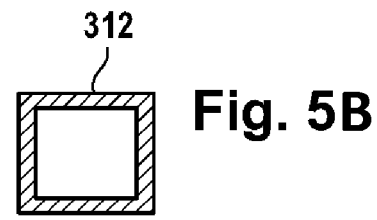
Figure 5C:
Figure 5D:
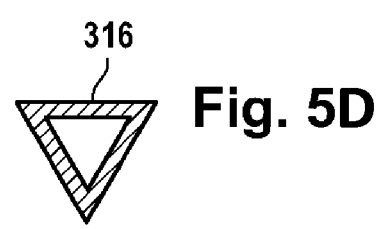
Figure 5E:

FIG. 4 shows a further schematic view of an actuating rod with a swivel connection. In this embodiment, the first and second rails 334 and 336 of the actuating rod are connected with a hinge 340, e.g. in the form of a circular clip, which enables parts 334 and 336 to pivot relative to one another. One or more latching noses can be located on the circular clip 340 in order to lock parts 334 and 336 with one another at a desired angle.

The use of a hinge as shown in FIG. 4 also has the advantage that, for example, in the case of a sideways collision against a motor vehicle door with an actuating rod 300 as shown in FIG. 4, the risk of injury for occupants of the motor vehicle can be reduced, because the presence of the hinge 340 means that parts 334 and 336 can pivot away, instead of splitting due to a strong and inelastic connection.

FIGS. 5A-5E shows a schematic view of an embodiment of an actuating rod 114. FIGS. 5A-5E thereby shows various cross-sections 310, 312, 314, 316 and 318 of such an actuating rod 114. One embodiment of an actuating rod 114 according to the described subject matter can assume one or more of cross-sections 310 through 318 in its course. The location-dependent choice of the cross-section (310 through 318) of the actuating rod 114 depends on the respective local forces, moments of torque and functional requirements. Manufacturing the actuating rod through plastic injection molding is hereby especially advantageous because in principle, any cross-section can be chosen.

Figure 6:
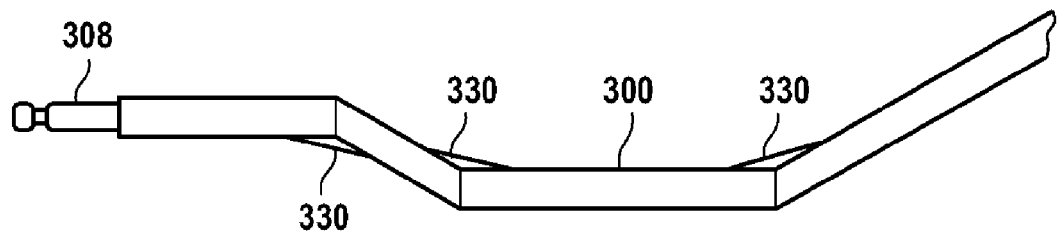
FIG. 6: an embodiment of an actuating rod with a control knob.

FIG. 6 shows an embodiment of an actuating rod 300 with a control knob 308. Decisive in FIG. 6 is the fact that the actuating rod 300 features multiple successive inflection points on each of which one reinforcing rib 330 is located. The reinforcing ribs 330 give the actuating rod 300 the required stability at the inflection points to be able to transmit effective torque and forces when the control knob 308 is actuated.

Figure 7:
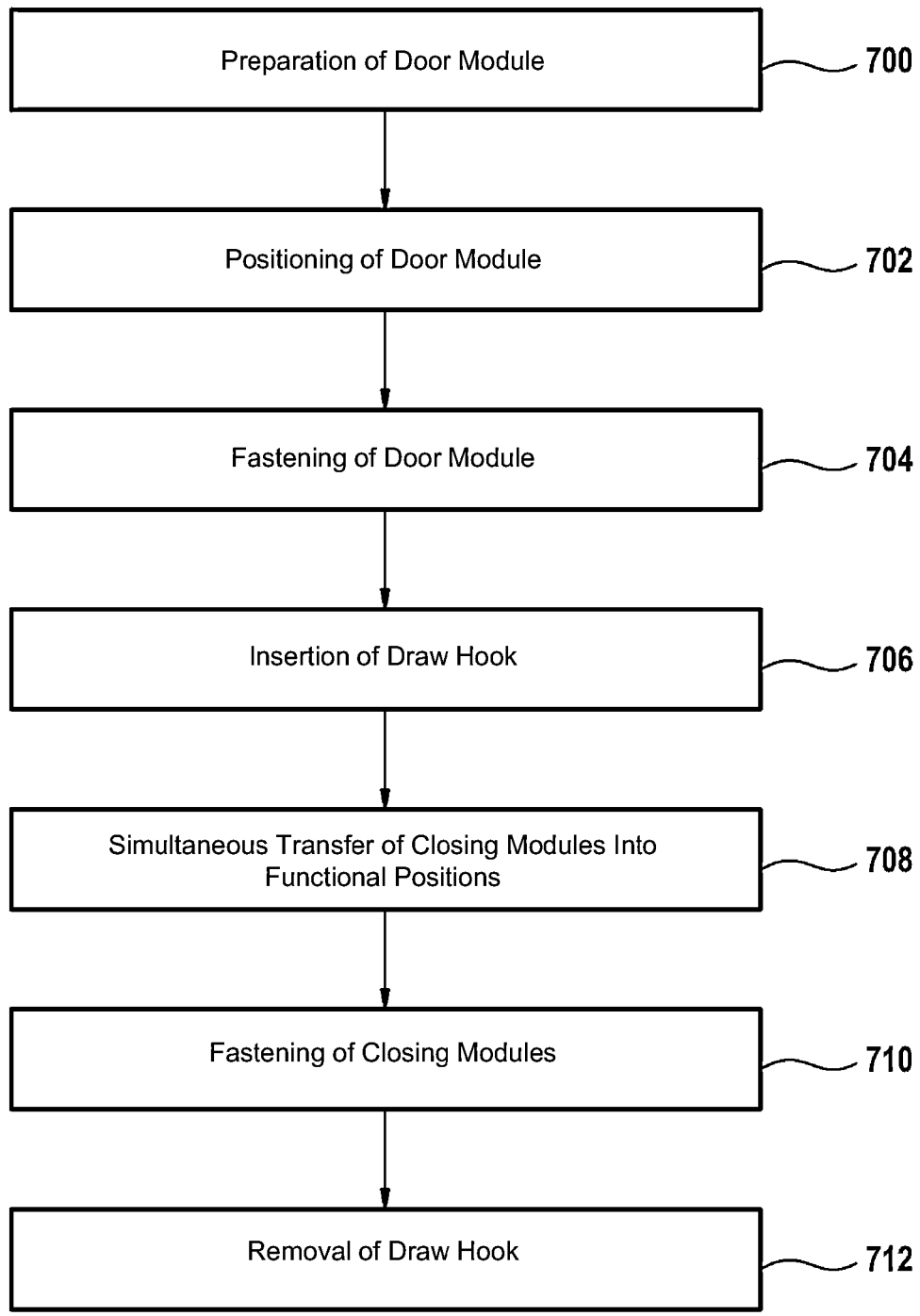
FIG. 7: a flow chart of a method according to the described subject matter for installing a sliding door module on a sliding door of a motor vehicle.

FIG. 7 shows a flow chart of a method according to the described subject matter for installing a sliding door module on a sliding door of a motor vehicle. In step 700 the sliding door module is prepared, whereby in step 700 the first and second closing modules, which are arranged on the sliding door module, are located in an installation position in which these closing modules do not protrude beyond the outer edge of the door module. In step 702 the positioning of the sliding door module in a mounting device or opening of the interior door plate of the motor vehicle sliding door takes place in order to be fastened subsequently, in step 704, to the vehicle door at least provisionally. Such a provisional fastening can take place for example in the form of latching connections such as clips.

In step 706, a draw hook is inserted into the rotary latch of one of the closing modules, which enables both closing modules to be transferred together, with a pulling motion of the draw hook, from their installation positions into their functional positions in step 708, due to their coupling to one another. Both closing modules thereby protrude beyond the edge of the door module in their functional positions. In step 710 the fastening of the closing modules with appropriate means to the front sides of the motor vehicle door finally takes place. In the last step 712 finally the removal of the draw hook from the rotary latch of the closing module takes place, which allows the draw hook to be used again for another installation of another sliding door module.

LIST OF REFERENCE NUMERALS

100 Sliding door of a motor vehicle
101 Window pane opening
102 Sliding door module
104 Opening
106 Closing module
107 Closing module
110 Door-lock interior control
112 Door-lock exterior control
114 Actuating rod
116 Hinge
118 Connecting element
120 Latching element
122 Latching nose
124 Gear teeth
130 First edge of the sliding door module
131 Second edge of the sliding door module
132 First front side
133 Second front side
134 Fastening means
136 Draw hook
138 Swivel axis
140 Lever
142 Locking device
500 Rotary latch
200 Direction
202 Rise
204 Drop
300 Actuating rod
308 Control knob
310 Cross-section
312 Cross-section
314 Cross-section
316 Cross-section
318 Cross-section
330 Reinforcing rib
334 First rail
336 Second rail
338 Retaining element
340 Hinge

What is claimed is:

1. A sliding door module for a sliding door of a motor vehicle, said sliding door module comprising:
a first closing module, whereby said first closing module in a first installation position does not protrude beyond a first outer edge of the sliding door module, whereby said first closing module is constructed for transfer into a first functional position, whereby said first closing module in said first functional position protrudes beyond said first edge of the sliding door module;
  a second closing module, whereby said second closing module in a second installation position does not protrude beyond a second outer edge of the sliding door module, whereby said second closing module is constructed for transfer into a second functional position, whereby said second closing module in said second functional position protrudes beyond said second edge of the sliding door module, whereby said first outer edge is spatially separated from said second outer edge;
  at least two first actuating rods for transmitting an actuating force from said first closing module to said second closing module, whereby said at least two first actuating rods are comprised of plastic, whereby said at least two first actuating rods are flexibly connected with said first and second closing modules, respectively, and with a pivoting lever around a swivel axis in the y-direction;
  further comprising a third actuating rod for transmitting an actuating force from said first or second closing module to an actuating element, whereby said actuating element is a door-lock exterior control or a door-lock interior control, whereby said third actuating rod is comprised of plastic, and wherein said third actuating rod is formed by a first and a second rail and further includes a connecting element for connecting said first and second rails with one another, the connecting element comprising a retaining element for locking said first and second rails in said functional position of said first and second closing modules.

2. The sliding door module according to claim 1, additionally comprising a door locking device, whereby said door locking device is connected with said second closing module via a second actuating rod for transmitting an actuating force, whereby said second actuating rod is comprised of plastic.

3. The sliding door module according to claim 2, whereby said door locking device is arranged on a lower door edge of the sliding door.

4. The sliding door module according to claim 1, additionally comprising at least:
  a first latching element, whereby said first latching element is constructed for fixing said first closing module in said first installation position or in said first functional position; and
  a second latching element, whereby said second latching element is constructed for fixing said second closing module in said second installation position or in
  said second functional position.

5. The sliding door module according to claim 4, whereby either or both of said first and second latching element is generally rod-shaped.

6. The sliding door module according to claim 4, whereby either or both of said first and said second latching elements feature a plurality of latching positions.

7. The sliding door module according to one of claim 4, whereby either or both of said first and said second latching element is constructed in one piece with the sliding door module.

8. The sliding door module according to claim 1, whereby said connecting element comprises a hinge or a film hinge.

9. The sliding door module according to claim 1, whereby said retaining element is constructed to lock the first and second rails in said first functional position of said first closing module and said second functional position of said second closing module.

10. The sliding door module according to claim 1, whereby at least one of said actuating rods features one or more reinforcing ribs, said reinforcing ribs arranged on a radius of said actuating rod.

11. The sliding door module according to claim 1, whereby at least one of said actuating rods features a variable cross-section in said actuating rods longitudinal course.

12. The sliding door module according to claim 1, whereby at least one of said actuating rods is comprised of at least two different plastics.

13. The sliding door module according to claim 1, whereby:
  said first closing module is transferred into said first functional position by a first translational movement or a rotary movement around a first closing module swivel axis; and
  said second closing module is transferred into said second functional position by a second translational movement or a rotary movement around a second closing module swivel axis.

14. The sliding door module according to claim 13, whereby said first closing module swivel axis and/or said second closing module swivel axis runs essentially in the y-direction of the motor vehicle.

15. The sliding door module according to claim 13, additionally comprising a rod-shaped latching element constructed for directing said first translational movement and/or said second translational movement.

16. The sliding door module according to claim 13, whereby said first closing module and said second closing module are transferred together into their respective functional positions by said first translational movement or said second translational movement.

17. The sliding door module according to claim 1, whereby either or both of:
  said first closing module has a first draw hook mounting for a draw hook, whereby said first draw hook mounting is provided for transferring said first closing module from said first installation position into said first functional position using said draw hook; and
  said second closing module has a second draw hook mounting for said draw hook, whereby said second draw hook mounting is provided for transferring said second closing module from said second installation position into said second functional position using said draw hook.

18. The sliding door module according to claim 17, whereby either or both of:
  said first draw hook mounting is a rotary latch of said first closing module; and said second draw hook mounting is a rotary latch of said second closing module.

19. A method for installation of a sliding door module for a sliding door of a motor vehicle, said method comprising:
  positioning the sliding door module in a mounting device of the sliding door, whereby a first closing module is in a first installation position and a second closing module is in a second installation position, said first closing module not protruding beyond a first outer edge of the sliding door module when in said first installation position and said second closing module not protruding beyond a second outer edge of the sliding door module when in said second installation position;
  transferring said first closing module from said first installation position into a first functional position, said first closing module protruding beyond said first outer edge of the sliding door when in said first functional position;

transferring said second closing module from said second installation position into a second functional position, said second closing module protruding beyond said second outer edge of the sliding door when in said second functional position;

transmitting an actuating force from said first closing module to said second closing module via at least two first actuating rods, whereby said at least two first actuating rods comprise plastic and are flexibly connected with said first closing module and said second closing module and a lever that pivots around a swivel axis in the y-direction;

transmitting said actuating force from said first closing module or said second closing module to an actuating element via a third actuating rod, whereby said actuating element is a door-lock exterior control or a door-lock interior control, said third actuating rod comprises plastic and constructed of a first rail, a second rail, and a connecting element for connecting said first rail to said second rail, said connecting element comprising a retaining element for locking said first rail and said second rail in said first functional position for said first closing module and in said second functional position for said second closing module.

20. The method according to claim 19, whereby either or both of (i) said first closing module has a first draw hook mounting for a draw hook and (ii) said second closing module has a second draw hook mounting for said draw hook;

whereby said transfer of said first closing module and said second closing module from their respective installation positions into their respective functional positions comprises the following steps:

insertion of said draw hook into said first draw hook mounting and transfer of said first closing module from said first installation position into said first functional position by a pulling movement with said draw hook; and insertion of said draw hook into said second draw hook mounting and transfer of said second closing module from said second installation position into said second functional position by a pulling movement with said draw hook.

21. The method according to claim 19, whereby through said transfer of said first closing module or said second closing module, said first closing module and said second closing module are transferred together into their respective functional positions.

* * * * *